US012327924B2

(12) United States Patent
Zhu et al.

(10) Patent No.: US 12,327,924 B2
(45) Date of Patent: Jun. 10, 2025

(54) PHASE-SHIFTING UNIT, ANTENNA UNIT, PHASED ARRAY UNIT AND PHASED ARRAY

(71) Applicant: TIME VARYING TRANSMISSION CO., LTD., Hunan (CN)

(72) Inventors: Rui Zhu, Hunan (CN); Yuexing Li, Los Angeles, CA (US); Qiang Xu, Hunan (CN); Yaozhong Liu, Los Angeles, CA (US); Yougang Fang, Hunan (CN)

(73) Assignee: TIME VARYING TRANSMISSION CO., LTD., Hunan (CN)

( * ) Notice: Subject to any disclaimer, the term of this patent is extended or adjusted under 35 U.S.C. 154(b) by 473 days.

(21) Appl. No.: 17/923,292

(22) PCT Filed: Apr. 22, 2021

(86) PCT No.: PCT/CN2021/089025

§ 371 (c)(1),
(2) Date: Nov. 4, 2022

(87) PCT Pub. No.: WO2021/223602

PCT Pub. Date: Nov. 11, 2021

(65) Prior Publication Data

US 2023/0335897 A1 Oct. 19, 2023

(30) Foreign Application Priority Data

May 6, 2020 (CN) ......................... 202010374542.0

(51) Int. Cl.
*H01Q 3/36* (2006.01)
*H01P 1/18* (2006.01)

(52) U.S. Cl.
CPC ................. *H01Q 3/36* (2013.01); *H01P 1/18* (2013.01)

(58) Field of Classification Search
CPC . H01P 1/18; H01P 1/184; H01P 9/006; H01Q 21/061; H01Q 21/08; H01Q 3/2682; H01Q 3/36
See application file for complete search history.

(56) References Cited

U.S. PATENT DOCUMENTS

| | | | |
|---|---|---|---|
| 5,877,659 | A | 3/1999 | Knowles et al. |
| 2002/0186098 | A1 | 12/2002 | Sayyah |

(Continued)

FOREIGN PATENT DOCUMENTS

| | | | |
|---|---|---|---|
| CN | 1108008 | A | 9/1995 |
| CN | 109216835 | A | 1/2019 |

(Continued)

OTHER PUBLICATIONS

Extended European Search Report issued by the European Patent Office in connection with International Application No. 21799659. 4, dated May 6, 2024.

(Continued)

*Primary Examiner* — Timothy X Pham
(74) *Attorney, Agent, or Firm* — George Likourezos; Carter, DeLuca & Farrell LLP

(57) ABSTRACT

Provided are a phase-shifting unit, an antenna unit, a phased array unit, and a phased array. The phase-shifting unit includes a common port, a switch, and two connection ports. A transmission line between the two connection ports is provided with at least two branch ports. Positions of the at least two branch ports on the transmission line are different. The transmission line between every two adjacent branch ports includes a delay line. The switch is configured to switch to a target branch port and establish the connection between the target branch port and the common port so that the common port is connected to the two connection ports to form two paths. Each path is configured to establish the communication connection between the connection port (Continued)

corresponding to each path and the common port to transmit a signal.

16 Claims, 8 Drawing Sheets

(56) References Cited

U.S. PATENT DOCUMENTS

| | | | |
|---|---|---|---|
| 2009/0189826 | A1 | 7/2009 | Timofeev et al. |
| 2016/0049709 | A1 | 2/2016 | Karikomi et al. |
| 2017/0187099 | A1* | 6/2017 | Patel ........................ H01Q 5/42 |
| 2018/0006014 | A1* | 1/2018 | Mayer .................. H05K 1/0259 |
| 2018/0294537 | A1 | 10/2018 | Borysenko |

FOREIGN PATENT DOCUMENTS

| | | | |
|---|---|---|---|
| CN | 109314291 | A | 2/2019 |
| CN | 110233316 | A | 9/2019 |
| CN | 110611169 | A | 12/2019 |
| CN | 110690583 | A | 1/2020 |
| CN | 111525215 | A | 8/2020 |
| CN | 112151964 | A | 12/2020 |
| EP | 3386029 | A1 | 10/2018 |
| JP | 2009044495 | A | 2/2009 |
| WO | 9943036 | A1 | 8/1999 |
| WO | 2008056184 | A1 | 5/2008 |

OTHER PUBLICATIONS

International Search Report issued by the China National Intellectual Property Administration (ISA/CN) in connection with International Application No. PCT/CN2021/089025, dated Jul. 2, 2021, pp. 1-2, with English-language translation.

Lin, Jin, "5-bit RF MEMS Switch Time Delay Line Shifter" Journal of Microwaves (Apr. 2011) pp. 1-4, vol. 27, No. 2.

Chinese Office Action issued in corresponding CN Patent Application No. 202010374542.0, dated Mar. 25, 2021, together with English-language translation.

* cited by examiner

PHASE-SHIFTING UNIT, ANTENNA UNIT, PHASED ARRAY UNIT AND PHASED ARRAY

CROSS-REFERENCE TO RELATED APPLICATIONS

This is a National Stage Application filed under 35 U.S.C. 371 based on International Patent Application No. PCT/CN2021/089025, filed on Apr. 22, 2021, which claims priority to Chinese Patent Application No. 202010374542.0 filed with the China National Intellectual Property Administration (CNIPA) on May 6, 2020, the disclosures of which are incorporated herein by reference in their entireties.

TECHNICAL FIELD

The present application relates to the field of communications, for example, a phase-shifting unit, an antenna unit, a phased array unit, and a phased array.

BACKGROUND

With the application and popularization of mobile communications, there is an increasing demand for the data rate of mobile communications. An antenna array rapidly determines an optimal beam direction through beam scanning, thereby accurately aligning the beam, ensuring the quality of mobile communications, and increasing the data rate of mobile communications. Generally, the antenna array implements beam scanning by using a phased array.

The phased array implements the beam scanning by adjusting the phase difference between antenna units. There are many manners and structures to implement the phase control between units. For example, the phase can be controlled by a phase shifter. In a radio frequency link, typically, one transceiver channel corresponds to one antenna. Generally speaking, for a transmit channel, the phase shifter is located before the power amplifier of the transmit channel to ensure that the power efficiency of a radio frequency signal is in an optimal state. For a receiving channel, the phase shifter is located after the low-noise amplifier of the receiving channel to ensure that the system noise performance is in an optimal state. Such a structure means that each channel is provided with a phase shifter. Such a structure can occupy a large chip area and chip quantity and increases the system cost.

SUMMARY

The present application provides a phase-shifting unit, an antenna unit, a phased array unit, and a phased array, to reduce the chip area in the phased array, reduce costs, and simplify the control process of beam scanning.

A phase-shifting unit is provided. The phase-shifting unit includes a common port, a switch, and two connection ports.

A transmission line between the two connection ports is provided with at least two branch ports. Positions of the at least two branch ports on the transmission line are different. The transmission line between every two adjacent branch ports includes a delay line.

The switch is configured to switch to a target branch port and establish the connection between the target branch port and the common port so that the common port is connected to the two connection ports to form two paths.

Each path is configured to establish the communication connection between the connection port corresponding to the path and the common port to transmit a signal. The magnitude of phase shift between a phase of an input signal of each path and a phase of an output signal of the path matches the delay line included in the path.

An antenna unit is provided. The antenna unit includes one phase-shifting unit as described above and two antennas.

Two connection ports of the phase-shifting unit are connected to the two antennas in one-to-one correspondence.

A phased array unit is provided. The phased array unit includes an antenna unit group and at least one phase-shifting unit group.

The antenna unit group is connected to the at least one phase-shifting unit group in series.

The antenna unit group includes a plurality of antenna units as described above. Each phase-shifting unit group includes at least one phase-shifting unit as described above.

Of two adjacent unit groups connected in series, the common port of each unit in one unit group is connected to the connection port of one unit in another unit group located after the one unit group. The first unit group in the phased array unit is the antenna unit group. The last unit group in the phased array unit is one phase-shifting unit group. The common port of each antenna unit in the antenna unit group is connected to the connection port of one phase-shifting unit in a phase-shifting unit group which is adjacent to and located after the antenna unit group and is connected to the antenna unit group in series.

A phased array is provided. The phased array includes at least one phased array unit as described above and at least one signal transceiver module.

Each signal transceiver module is connected to at least one of the at least one phased array unit.

The common port of a phase-shifting unit in the last unit group of each phased array unit is connected to one signal transceiver module corresponding to the phased array unit.

The at least one signal transceiver module is configured to transmit a radio frequency signal to each phased array unit and receive a radio frequency signal transmitted by each phased array unit.

Each phased array unit is configured to adjust the radio frequency signal transmitted by the at least one signal transceiver module to radio frequency signals of different phases and transmit the radio frequency signals to space, and adjust a received radio frequency signal to radio frequency signals of different phases and transmit the radio frequency signals to the at least one signal transceiver module.

DETAILED DESCRIPTION

The present application is described below in conjunction with drawings and embodiments.

Embodiment One

Figure 1:
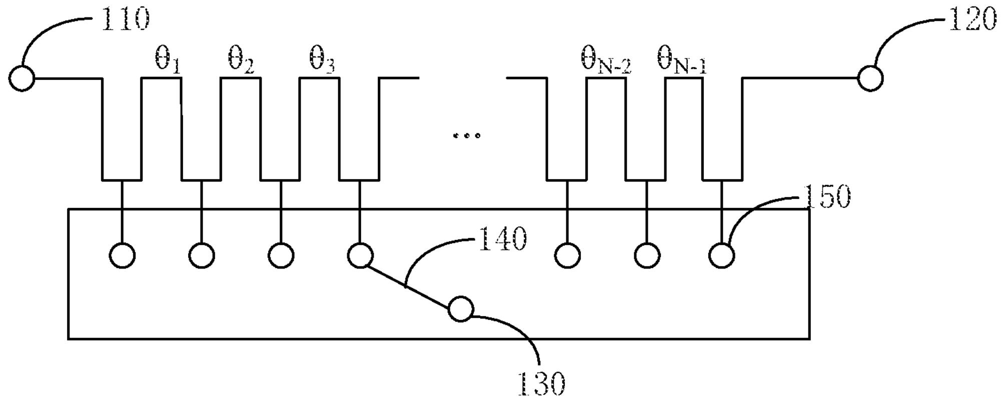
FIG. 1 is the diagram of a phase-shifting unit according to embodiment one of the present application.

FIG. 1 is the diagram of a phase-shifting unit according to embodiment one of the present application. This embodiment is applicable to a case where a communication signal is phase-shifted by a phased array. As shown in FIG. 1, the phase-shifting unit in this embodiment includes a common port 130, a switch 140, a connection port 110, and a connection port 120.

As input ports or output ports, the connection port 110, the connection port 120, and the common port 130 are all configured to be connected to other external units. The switch 140 is configured to adjust the magnitude of phase shift.

The transmission line between the connection port 110 and the connection port 120 is provided with at least two branch ports 150. Positions of different branch ports 150 on the transmission line are different. The transmission line between every two adjacent branch ports 150 includes delay lines. The transmission line is configured to establish the connection between the connection port 110 and the connection port 120. The transmission line between every two adjacent branch ports 150 may include all delay lines or merely part of delay lines. The delay lines are configured to delay the phase of the communication signal to achieve the effect of phase shift of the communication signal. All delay lines may be the same, partially different, or completely different.

The switch 140 is configured to switch to a target branch port 150 and establish the connection between the target branch port 150 and the common port 130 to form two paths. The target branch port 150 may refer to a branch port to which the switch 140 switches. The number of branch ports 150 to which the switch 140 switches at the same time is one, that is, the switch 140 can switch to only one branch port 150 at the same time. Typically, the number of target branch ports 150 in one phase-shifting unit is one. The switch 140 may select one branch port 150 from multiple branch ports 150 as a target branch port 150 and turn on the line between the target branch port 150 and the common port 130. Lines between the common port 130 and branch ports 150 other than the target branch port 150 are open circuits. The positions of different branch ports 150 on the transmission line are different, indicating that different selection ports of the switch 140 are separately connected to different positions on the transmission line. Thereby, the switch 140 switches between different positions to switch to any one of the branch ports 150 to turn on the line between the common port 130 and the any one of the branch ports 150. In this manner, the communication signal is shifted to different phases.

Exemplarily, the switch 140 may be a single-pole multiple-throw (SPMT) switch. The SPMT has one common port and multiple selection ports. The common port of the SPMT is connected to the common port 130 or directly used as the common port 130. Each selection port of the SPMT is connected to one branch port 150 or directly used as one branch port 150. The number of selection ports of the SPMT is the same as the number of branch ports 150. The selection ports are connected to different positions on the transmission line in order.

The two paths may include a first path and a second path. The first path is configured to establish the communication connection between the connection port 110 and the common port 130. The second path is configured to establish the communication connection between the connection port 120 and the common port 130. Each path is configured to transmit a communication signal. The communication signal may be transmitted from the connection port 110 to the common port 130, from the common port 130 to the connection port 110, from the connection port 120 to the common port 130, or from the common port 130 to the connection port 120.

In the process of transmitting the signal in the path, the passed delay line determines the shifted phase of the signal. Thus, the magnitude of phase shift between the phase of the input signal of the path and the phase of the output signal of the path, that is, the magnitude of phase shift of the signal before and after transmission through the path, matches the delay line included in the path.

Exemplarily, as shown in FIG. 1, among N branch ports 150, there are N−1 delay lines. The phase delays of the N−1 delay lines are $\theta_1$, $\theta_2$, $\theta_3$ . . . $\theta_{N-2}$ and $\theta_{N-1}$, respectively. Due to different switching positions of the switch 140, the signal may be shifted to different phases. The delay phases corresponding to N−1 delay lines may be the same, partially different, or completely different.

For example, the switch 140 switches to the fourth branch port 150 from left to right. In the path formed by the connection port 110 and the common port 130, the phase delay corresponding to the passed delay lines is $\theta_1+\theta_2+\theta_3$. Correspondingly, the magnitude of phase shift between the phase of the input signal of the path and the phase of the output signal of the path is $\theta_1+\theta_2+\theta_3$. In the path formed by the connection port 120 and the common port 130, the phase delay corresponding to the passed delay lines is $\theta_4+\theta_5+ . . . +\theta_{N-1}$. Correspondingly, the magnitude of phase shift between the phase of the input signal of the path and the phase of the output signal of the path is $\theta_4+\theta_5+ . . . +\theta_{N-1}$.

For another example, the switch 140 switches to the first branch port 150 from left to right. In the path formed by the connection port 110 and the common port 130, the phase delay corresponding to the passed delay line is 0. Correspondingly, the magnitude of phase shift between the phase of the input signal of the path and the phase of the output signal of the path is 0. In the path formed by the connection port 120 and the common port 130, the phase delay corresponding to the passed delay lines is $\theta_1+\theta_2+ . . . +\theta_{N-1}$. Correspondingly, the magnitude of phase shift between the phase of the input signal of the path and the phase of the output signal of the path is $\theta_1+\theta_2+ . . . +\theta_{N-1}$.

In an embodiment, multiple delay lines included in the transmission line are symmetrical about the midpoint of the transmission line between the two connection ports.

The multiple delay lines are symmetrical about the midpoint of the transmission line between the two connection ports, indicating that the first delay line is the same as the last delay line, that is, the magnitudes of phase shifts of the delays are the same, the second delay line is the same as the last second delay line, and so on. The delay lines in order are delay line 1, delay line 2 . . . delay line N−2 and delay line N−1. If the number N of the branch ports 150 is an even number and N−1 is an odd number, the delay line 1 is the same as the delay line N−1, the delay line 2 is the same as the delay line N−2, the delay line (N−1)/2 is the same as the delay line (N+1)/2, and the delay line N/2 does not have a symmetrical delay line. If the number N of the branch ports 150 is an odd number and N−1 is an even number, the delay line 1 is the same as the delay line N−1, the delay line 2 is the same as the delay line N−2, and the delay line (N−1)/2 is the same as the delay line (N+1)/2.

By setting symmetrical delay lines, the symmetry of the scanning beam can be implemented.

The multiple delay lines included in the transmission line may all be the same, and this is not limited in this embodiment of the present application.

The phase-shifting unit in this embodiment of the present application is applied to the phased array or may be applied to other scenarios in which phase shift is required. The phase-shifting effect is implemented by a simple structure so that the phase-shifting cost of a signal can be reduced, and the chip area in a phase-shifting module can be reduced.

According to this embodiment of the present application, a common port, a switch, and two connection ports are configured, delay lines are configured on the transmission line between the two connection ports, multiple branch ports are configured on the delay lines, the switch may select any one of the branch ports to be connected to the common port to form paths from the connection port to the branch port and from the branch port to the common port, that is, two paths are correspondingly formed due to the existence of the two connection ports, and the lengths of delay lines in different paths are different so that a communication signal forms a phase shift in paths during a transmission process to implement the phase-shifting effect. The function of a phase shifter is implemented by a simple structure so that issues of high cost, complex structure, and large occupied area caused by the use of multiple phase shifters in the phased array in the related art are solved. The phase-shifting effect is implemented by a simple structure so that the phase-shifting cost of the communication signal can be reduced, thereby reducing the cost of the phased array and the chip area in the phased array, and simplifying the control process of beam scanning.

Embodiment Two

Figure 2:
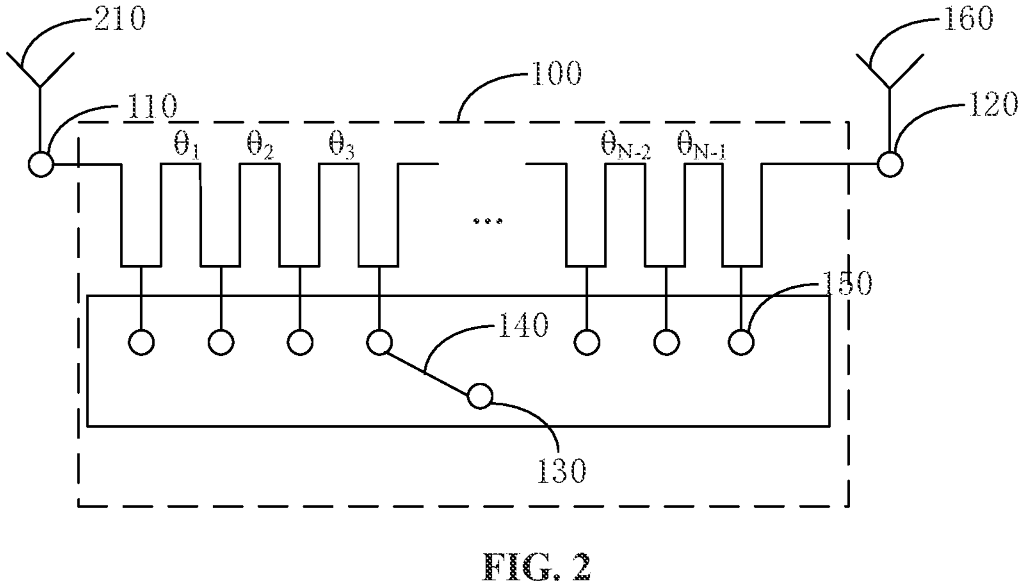
FIG. 2 is the diagram of an antenna unit according to embodiment two of the present application.

FIG. 2 is the diagram of an antenna unit according to embodiment two of the present application. This embodiment is applicable to a case where a communication signal is phase-shifted by a phased array. As shown in FIG. 2, the phase-shifting unit 100 described in the preceding embodiment and two antennas 160 and 210 are included. The connection ports of the phase-shifting unit 100 are connected to the antennas 160 and 210. Each connection port is connected to an antenna. The connection port 110 is connected to the antenna 210 and the connection port 120 is connected to the antenna 160.

According to this embodiment of the present application, an antenna unit is formed by connecting antennas to a phase-shifting unit with a simple structure. The function of a phase shifter is implemented by a simple structure so that a radio frequency signal can be transmitted and received, and the phase-shifting cost of the radio frequency signal can be reduced, thereby reducing the beam scanning cost of a phased array and the chip area in the phased array, and simplifying the control process of beam scanning.

Embodiment Three

Figure 3:
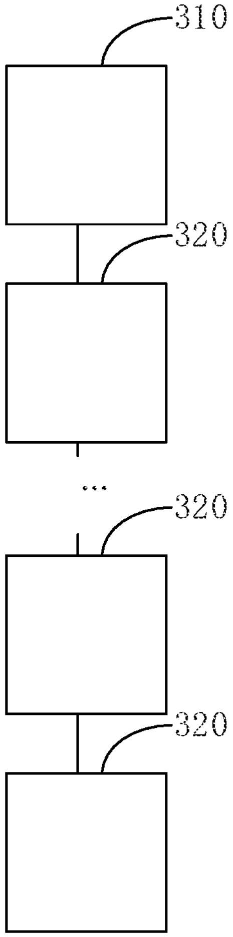
FIG. 3 is the diagram of a phased array unit according to embodiment three of the present application.

FIG. 3 is the diagram of a phased array unit according to embodiment three of the present application. This embodiment is applicable to a case where a communication signal is phase-shifted by a phased array. As shown in FIG. 3, the phased array unit includes an antenna unit group 310 and at least one phase-shifting unit group 320. Multiple unit groups are connected in series.

The antenna unit group includes the antenna unit described in the embodiments of the present application. The phase-shifting unit group includes the phase shifting unit described in the embodiments of the present application.

Figure 4:
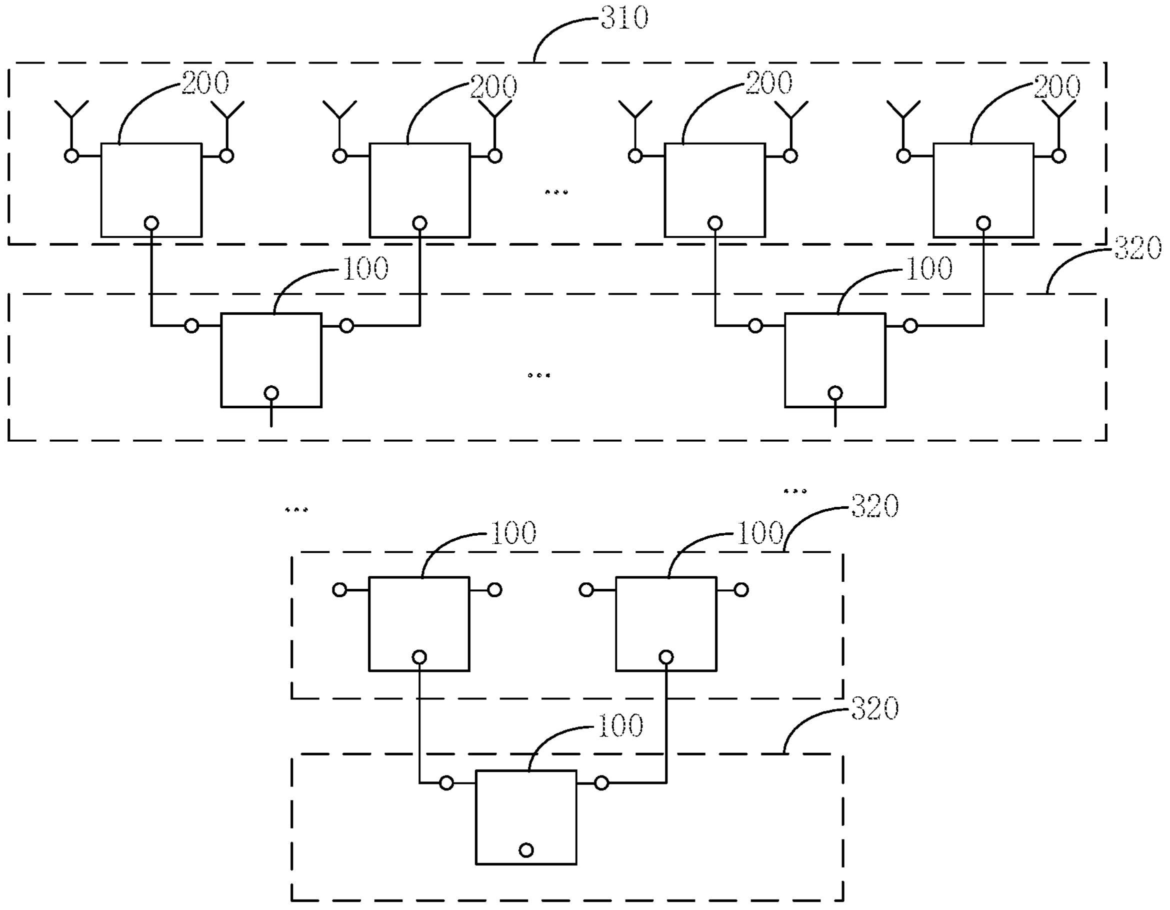
FIG. 4 is the diagram of another phased array unit according to embodiment three of the present application.

As shown in FIG. 4, of two adjacent unit groups connected in series, the common port of each unit in one unit group is connected to the connection port of a unit in another unit group located after the one unit group. The first unit group is the antenna unit group. The last unit group is the phase-shifting unit group. The common port of each antenna unit in the antenna unit group is connected to the connection port of a phase-shifting unit in a phase-shifting unit group which is adjacent to and located after the antenna unit group and is connected to the antenna unit group in series.

The last unit group includes only one phase-shifting unit. This phase-shifting unit is the last phase-shifting unit.

If the number of phase-shifting unit groups is one, this phase-shifting unit group is the last unit group. The phase-shifting unit in the last unit group is the last phase-shifting unit. In an embodiment, the number of phase-shifting unit groups is at least two. The last phase-shifting unit group is the last unit group. The phase-shifting unit in the last unit group is the last phase-shifting unit. The connection port in the last unit group is connected to the common port of the phase-shifting unit in the phase-shifting unit group located before the last unit group. The common port in the last unit group is connected to an external device, such as a transceiver module.

In each unit group, common ports of every two adjacent units in one unit group are connected to two connection ports of the same unit in a unit group which is adjacent to and located after the one unit group in one-to-one correspondence.

In the phased array unit, generally, the connection ports and the common port of each unit in each unit group are not floated, and the connection of multiple connection ports and multiple common ports are not overlapped. There is no case where multiple connection ports are connected to the same common port or one connection port is connected to multiple common ports.

Of two adjacent unit groups connected in series, the number of units in one unit group is the product of the number of units in another unit group located after the one unit group and 2.

If the unit groups are sorted in order from top to bottom, that is, from the first unit group to the last unit group, the order is unit group 1 (the first unit group is the antenna unit group), unit group 2, unit group 3 . . . unit group n−1, unit group n, and unit group n+1. The number of antenna units included in the antenna unit group is $2^n$.

Figure 5:
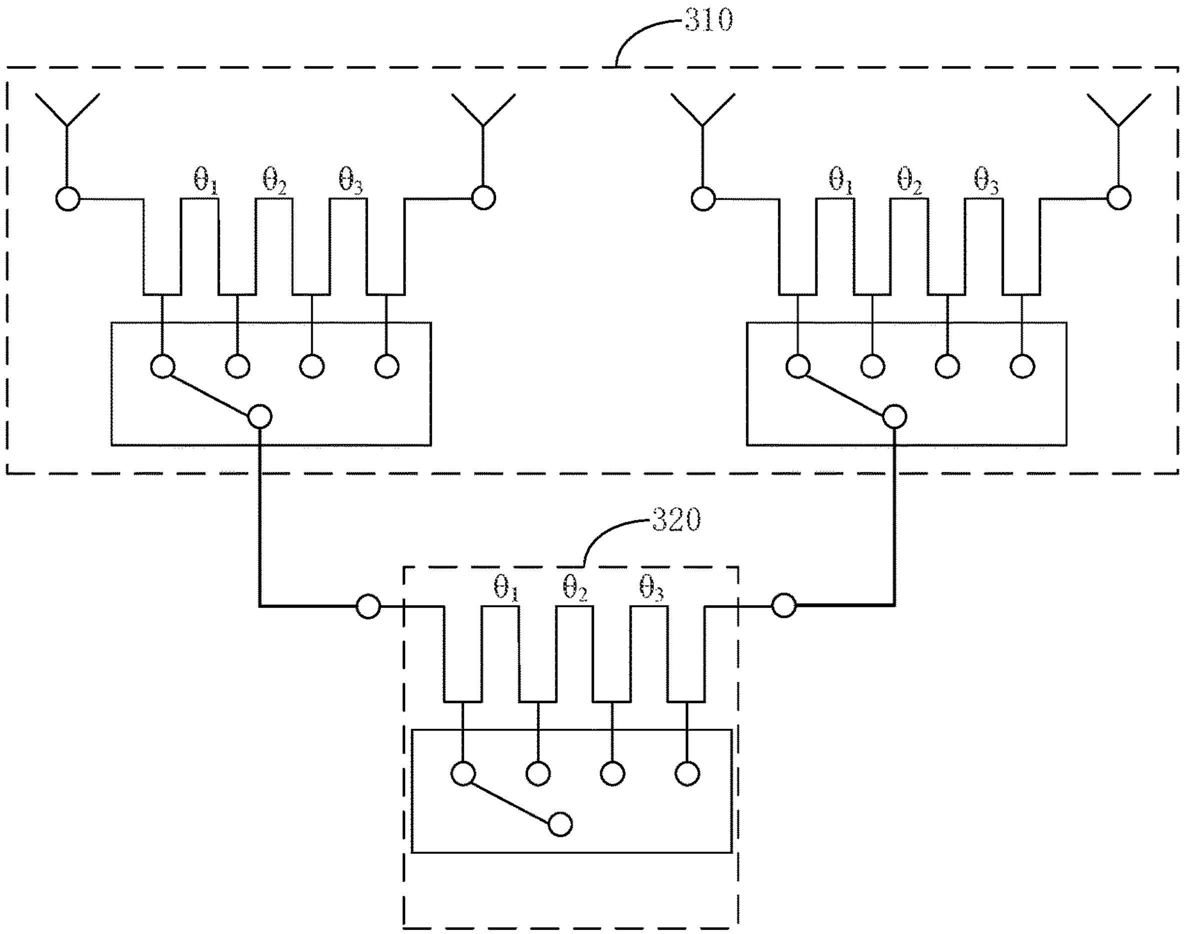
FIG. 5 is the diagram of another phased array unit according to embodiment three of the present application.

As shown in FIG. 5, the calculation process of the phase delay of the unit group 1 (antenna unit group 310) and the unit group 2 (phase-shifting unit group 320) is as follows.

Switches in all unit groups switch to the first branch port from left to right. Of each antenna unit in the unit group 1, the magnitudes of phase shifts of two connection ports relative to the common port are 0 and $\varnothing_1=\theta_1^1+\theta_2^1+\theta_3^1$, respectively. The superscript in $\theta_1^1$ denotes the identification information of the unit group. The subscript in $\theta_1^1$ denotes the identification information of a delay line. In the unit group 2, the magnitudes of phase shifts of two connection ports relative to the common port are 0 and $\varnothing_2=\theta_1^2+\theta_2^2+\theta_3^2$, respectively.

Figure 6:
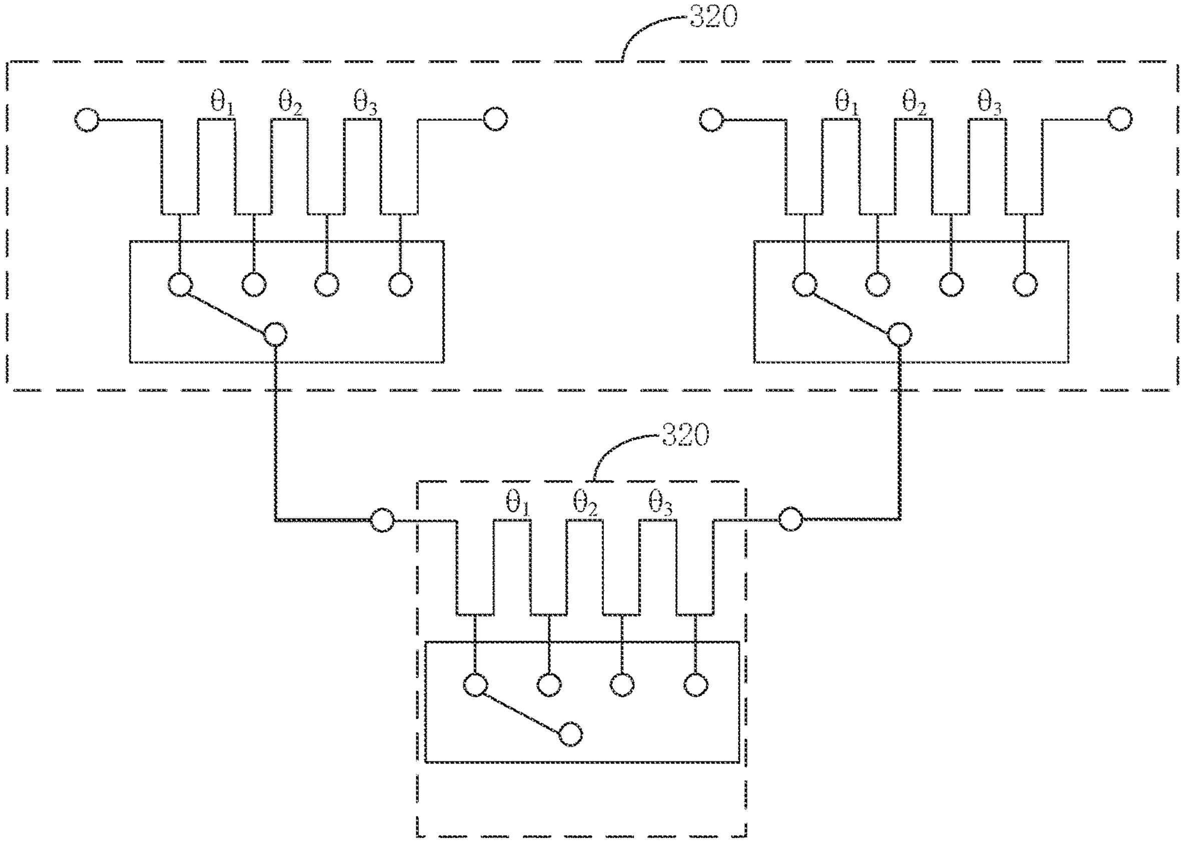
FIG. 6 is the diagram of part of phase-shifting unit groups in a phased array unit according to embodiment three of the present application.

As shown in FIG. 6, the calculation process of the phase delay of the unit group n and the unit group n+1 is as follows.

When switches in all unit groups switch to the first branch port from left to right, of each unit in the unit group n, the magnitudes of phase shifts of two connection ports relative to the common port of the unit are 0 and $\varnothing_n=\theta_1^n+\theta_2^n+\theta_3^n$, respectively. The superscript in $\theta_1^1$ denotes the identification information of the unit group. The subscript in $\theta_1^1$ denotes the identification information of the delay line. Of each unit in the unit group n+1, the magnitudes of phase shifts of two connection ports relative to the common port of the unit are 0 and $\varnothing_{n+1}=\theta_1^{n+1}+\theta_2^{n+1}+\theta_3^{n+1}$, respectively. The magnitudes of phase shifts of four connection ports of the first two units from left to right in the unit group n relative to the common port of the first unit from left to right in the unit group n+1 are 0, $\theta_1^n+\theta_2^n+\theta_3^n$, $\theta_1^{n+1}+\theta_2^{n+1}+\theta_3^{n+1}$, and $\theta_1^n+\theta_2^n+\theta_3^n+\theta_2^{n+1}+\theta_3^{n+1}$, respectively. By analogy, it is known that the phase delay of each unit in one unit group can be accumulated to units in another unit group located after the one unit group so that a certain magnitude of phase shift is generated between the antenna unit and the last phase-shifting unit.

For another example, when switches in all unit groups switch to the second branch port from left to right, of each unit in the unit group n, the magnitudes of phase shifts of two connection ports relative to the common port of the unit are $\theta_1^n$ and $\theta_2^n+\theta_3^n$, respectively. The superscript in $\theta_1^1$ denotes the identification information of the delay line. Of each unit in the unit group n+1, the magnitudes of phase shifts of two connection ports relative to the common port of the unit are $\theta_1^{n+1}$ and $\theta_2^{n+1}+\theta_3^{n+1}$, respectively. The magnitudes of phase shifts of four connection ports of the first two units in the unit group n from left to right relative to the common port of the first unit from left to right in the unit group n+1 are $\theta_1^n+\theta_1^{n+1}$, $\theta_1^{n+1}+\theta_2^n+\theta_3^n$, $\theta_1^n+\theta_2^{n+1}+\theta_3^{n+1}$, and $\theta_2^n+\theta_3^n+\theta_2^{n+1}+\theta_3^{n+1}$, respectively. Phase differences of the four connection ports relative to the first connection port from left to right are 0, $-\theta_1^n+\theta_2^n+\theta_3^n$, $-\theta_1^{n+1}+\theta_2^{n+1}+\theta_3^{n+1}$, and $-\theta_1^n+\theta_2^n+\theta_3^n+-\theta_1^{n+1}+\theta_2^{n+1}+\theta_3^{n+1}$, respectively. By analogy, it is known that the phase delay of each unit in one unit group can be accumulated to units in another unit group located after the one unit group so that a certain magnitude of phase shift is generated between the antenna unit and the last phase-shifting unit.

It can be seen that switching positions of the switch are different, the phase delay is different. The magnitude of phase shift between the antenna unit and the last phase-shifting unit is different from that in the first example (the example shown in FIG. 5) by layer accumulation. The beam direction is different.

In general, the number of branch ports in each unit group and the switching positions of the switch, that is, which branch port the switch switches to, can be arbitrarily set. However, to have a certain order of phases between antenna units in the phased array unit, each unit group may use the phase-shifting unit with the same branch ports, and the switching position of the switch is the same every time. Thus, the phased array unit provides N phase selections, that is, the phased array unit may have N beam selections.

According to this embodiment of the present application, multiple antenna units are combined to form an antenna unit group, phase-shifting units form a phase-shifting group, the antenna unit group and at least one phase-shifting unit group are spliced to form a phased array unit, and in the phased array unit, the function of a phase shifter is implemented by a simple structure. In this case, the volume of each phase-shifting unit is small, thereby greatly reducing the chip area in the phased array unit, and reducing the cost of the phased array unit. Moreover, the switching of beam direction and the adjustment of the magnitude of phase shift are implemented only by switching the switch, simplifying the control operation of phase shift.

Embodiment Four

Figure 7:
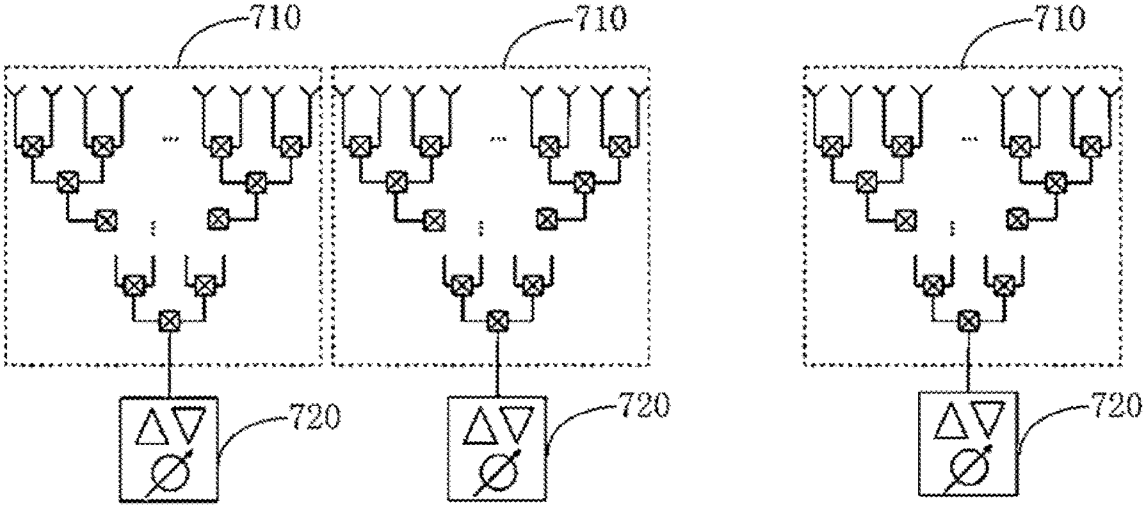
FIG. 7 is the diagram of a phased array according to embodiment four of the present application.

FIG. 7 is the diagram of a phased array according to embodiment four of the present application. This embodiment is applicable to a case where a communication signal is phase-shifted by a phased array. As shown in FIG. 7, the phased array includes at least one phased array unit 710 and at least one signal transceiver module 720 described in this embodiment of the present application.

The common port of the phase-shifting unit in the last unit group of the phased array unit 710 is connected to the signal transceiver module 720.

The number of signal transceiver modules 720 is at least one. Multiple phased array units 710 may be connected to one signal transceiver module 720 at the same time. Alternatively, one phased array unit 710 may be connected to only one signal transceiver module 720. This can be set as needed and is not limited in this embodiment of the present application.

Generally, the signal transceiver module 720 has two modes. One is a transmission mode configured to transmit a radio frequency signal to space. Another is a receiving mode configured to receive a radio frequency signal from space. The signal transceiver module 720 is configured to transmit a radio frequency signal to the phased array unit 710 and receive a radio frequency signal transmitted by the phased array unit 710. The phased array unit 710 is configured to adjust the radio frequency signal transmitted by the signal transceiver module 720 to radio frequency signals of different phases and transmit the radio frequency signals to the space, and adjust the received radio frequency signal to radio frequency signals of different phases and transmit the radio frequency signals to the signal transceiver module 720.

The phased array unit 710 is a passive array having no communication with active circuits. The signal transceiver module 720 is an active module having communication with active circuits.

The phased array unit 710 is connected to the signal transceiver module 720 so that the passive array can be combined with the active module to compensate the network loss (for example, through an amplifier) and improve the signal-to-noise ratio.

The number of antenna units included in the antenna unit group in the phased array unit 710 is $2^n$. The unit groups in the phased array unit 710 include unit group 1 (the first unit group is the antenna unit group), unit group 2, unit group 3 . . . unit group n−1, unit group n, and unit group n+1. That is, the number of unit groups is n+1.

According to this embodiment of the present application, the phased array unit is combined with the signal transceiver module to implement the combination of the passive array and the active module. Thus, the loss of the phased array unit can be reduced, the noise interference of the radio frequency system of the phased array can be reduced, and the power performance of the radio frequency system can be increased.

In an embodiment, the signal transceiver module may include a phase shifter. The phase shifter is configured to adjust the magnitudes of phase shifts between multiple phased array units.

The phase shift is performed by a delay line. The magnitude of phase shift is determined by the delay line. The magnitude of phase shift corresponding to the delay line is fixed so that it is difficult to accurately adjust the magnitude of phase shift. Thus, during the operation of the phased array, when a specific scanning angle is given, the phased array unit selects an appropriate switching position of the switch so that the beam range of the phased array unit covers the required angle and rough alignment is performed. The phase between arrays is then adjusted by a phase shifter to achieve precise alignment.

By configuring a phase shifter in the signal transceiver module, a finer phase adjustment can be implemented, and the adjustment accuracy of phase can be improved.

In a radio frequency system, by using impedance matching on a transmission line, more high-frequency signals can be transmitted to load points, reducing signals reflected back to source points, thereby improving power efficiency.

Of each unit in each unit group, multiple switch contacts are overlapped with the delay line. Impedances of two connection ports in each unit are connected in parallel, causing the port load impedance of the common port to be halved and impedance mismatch between the transmission line and the port. Therefore, the impedance of the transmission line needs to be set.

In an embodiment, the characteristic impedance of the transmission line between two connection ports of each unit in the unit group is equal to the product of impedance of the common port of the unit and 2. The impedance of each connection port is equal to the product of the impedance of the common port and 2.

Of two adjacent unit groups connected in series, the common port of each unit in one unit group is connected to the connection port of a unit in another unit group located after the one unit group, and the input impedance of the connection port of the unit in the another unit group located after the one unit group is transformed into the input impedance of the common port of each unit in the one unit group through a matching network. The impedance of the connection port is equal to the input impedance of the connection port. The input impedance of the common port is equal to the impedance of the common port.

Figure 8:
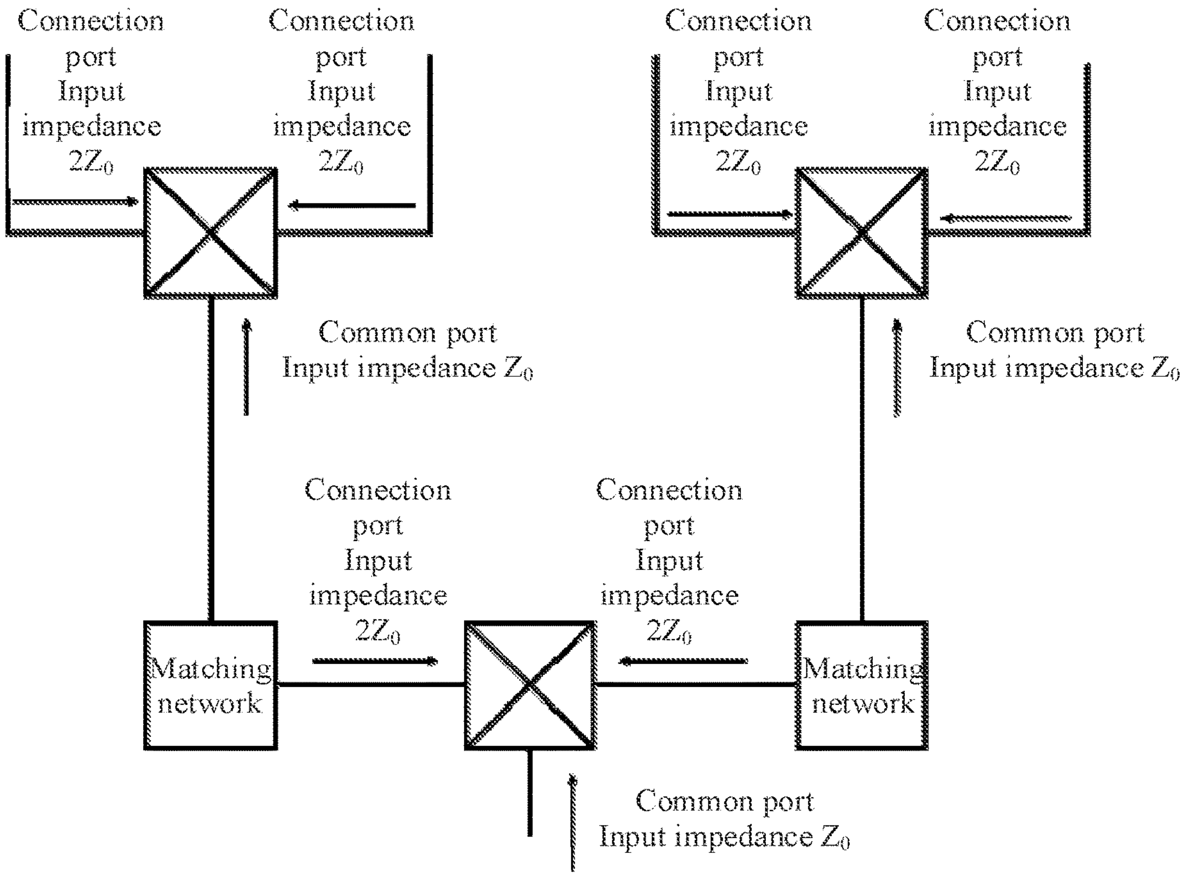
FIG. 8 is the diagram of impedance matching according to embodiment four of the present application.

As shown in FIG. 8, for each unit, the impedance of the common port is $Z_0$, and the impedance of each connection port is $2Z_0$. The source of the impedance between two connection ports of each unit is the delay line on the transmission line, that is, as shown in FIG. 1, the characteristic impedance of the zigzag polyline (that is, the delay line) associated with $\theta_i$, (i=1, 2 . . . N−1) is $2Z_0$.

Exemplarily, in a radio frequency system in which the impedance of the common port is 50Ω, to implement impedance matching, ideally, if non-ideal parameters of a device such as a switch are not taken into account, two connection ports may be first converted into 100Ω. Then, the transmission line between the two connection ports may be provided with 100Ω characteristic impedance. In addition, the transmission line needs to be adjusted according to parasitic parameters of the switch to optimize impedance matching and decrease insertion loss.

Port impedance is configured to implement impedance matching of the transmission line, to reduce the reflection of a high-frequency radio frequency signal, and to improve the transmission efficiency of the radio frequency signal.

In each phased array unit of the phased array, all units have the same structure, and all units are the same in terms of the number of branch ports.

In one example, the phased array may include one-dimensional phased array units. Positions of target branch ports of all of the one-dimensional phased array units are the same, that is, switching positions of the switch are the same.

Exemplarily, the delay line between two adjacent branch ports of each of the one-dimensional phased array units is symmetrical about the midpoint of the transmission line between two connection ports. That is, the phase difference of the delay corresponding to the delay line is symmetrical about the midpoint of the transmission line.

Figure 9:
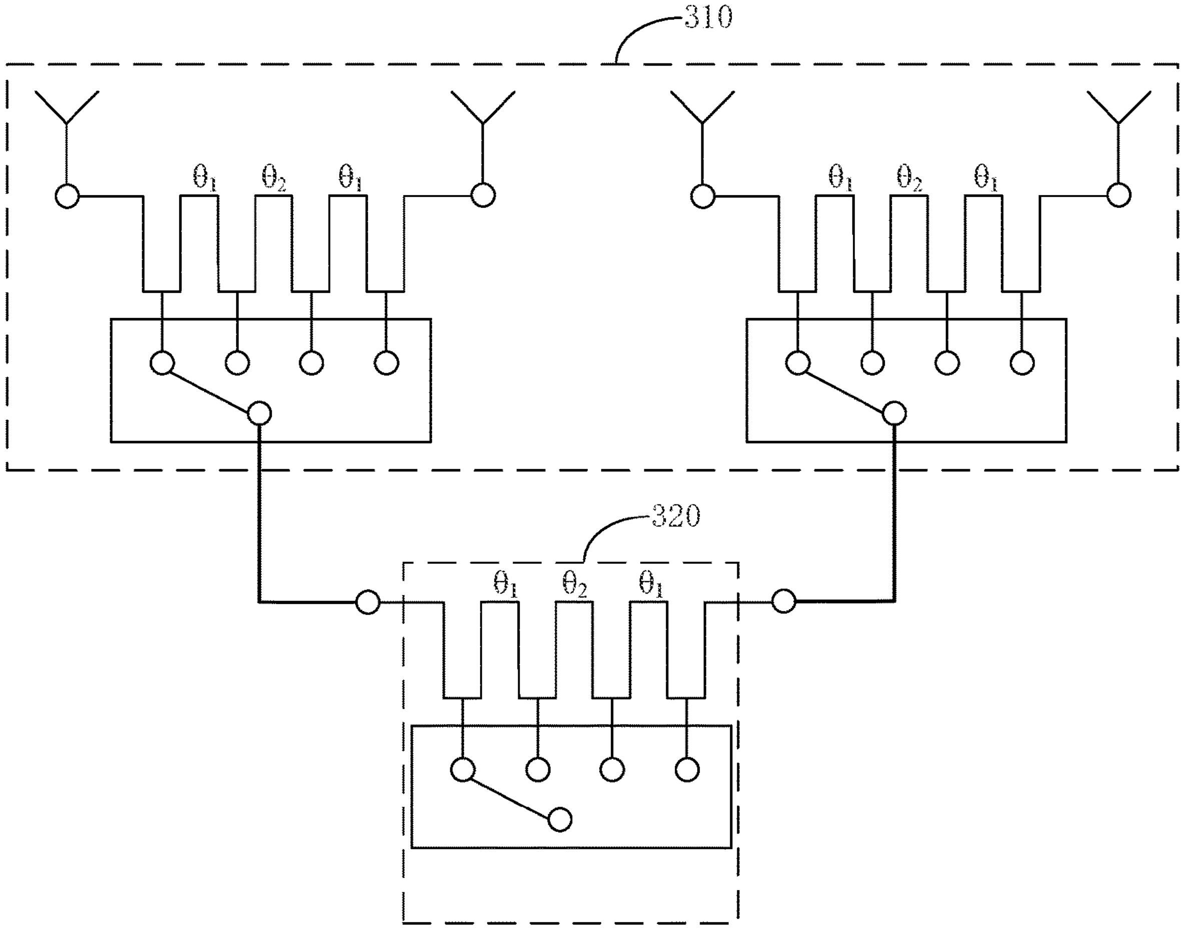
FIG. 9 is the diagram of a one-dimensional phased array according to embodiment four of the present application.

For example, as shown in FIG. 9, the one-dimensional phased array units are 1×4 phased array units, including antenna unit groups and one phase-shifting unit group. In this case, units in each unit group are the same in terms of the distribution of delay lines. The magnitudes of phase shifts corresponding to the delay lines from left to right of each unit are $\theta_1$, $\theta_2$, and $\theta_1$, respectively.

When switches in all unit groups switch to the first branch port from left to right, the magnitudes of phase shifts of four antennas are 0, $2\theta_1^1+\theta_2^1$, $2\theta_1^2+\theta_2^2$, and $2\theta_1^2+\theta_2^2+2\theta_1^1+\theta_2^1$, respectively.

When switches in all unit groups switch to the second branch port from left to right, the magnitudes of phase shifts of four antennas relative to the common port are $\theta_1^1+\theta_1^2$, $\theta_1^2+\theta_1^1+\theta_2^1$, $\theta_1^2+\theta_2^2+\theta_1^1$, and $\theta_1^2+\theta_2^2+\theta_1^1+\theta_2^1$, respectively. Phase differences of the four antennas relative to the first antenna from left to right are 0, $\theta_2^1$, $\theta_2^2$, and $\theta_2^2+\theta_2^1$, respectively.

If the phased array unit is a uniform array unit, the phase of the antenna is an arithmetic progression, that is, the magnitudes of phase shifts corresponding to delay lines in two unit groups need to satisfy that $2\theta_1^1=\theta_1^2$ and $2\theta_2^1=\theta_2^2$.

The phase delay setting is determined according to the angle scanning range of the antenna. For example, when the scanning range is ±40 degrees, it may be set that $\theta_1^1=\theta_2^1=30°$ and $\theta_1^2=\theta_2^2=60°$. Correspondingly, when switches in all unit groups switch to the first branch port from left to right, phases of four antennas are 0°, 90°, 180°, and 270°, respectively. When switches in all unit groups switch to the second branch port from left to right, the phases of the four antennas are 0°, 30°, 60°, and 90°, respectively. Correspondingly, switches in all unit groups switch to the third branch port from left to right, and the phase is the same as that of switching to the second branch port. Switches in all unit groups switch to the fourth branch port from left to right, and the phase is the same as that of switching to the first branch port. Thus, the third branch port is symmetrical to the second branch port, and the fourth branch port is symmetrical to the first branch port, thereby implementing the symmetry of the beam.

In one example, the phased array may include two-dimensional phased array units. Among the two-dimensional phased array units, positions of target branch ports of two unit groups separated by one unit group are the same, that is, switching positions of switches are the same. Positions of target branch ports associated with units in two unit groups and connected to each other are different.

In an embodiment, n is an even number. Among multiple unit groups connected in series, positions of target branch ports associated with two unit groups adjacent and connected to each unit group are the same. Positions of target branch ports associated with two unit groups adjacent and connected to each other are different.

n=2k, and k is a positive integer. Thus, the number of antenna units included in an antenna unit group is $4^k$. Positions of target branch ports associated with different units in the same unit group are the same. The target branch ports associated with a unit group actually refer to the target branch ports associated with each unit in the unit group.

Positions of target branch ports associated with a unit group are the same, indicating that switching positions of switches associated with the unit group are the same. For example, the target branch port associated with each unit in the unit group is the second branch port from left to right. Two unit groups adjacent and connected to each unit group may refer to two unit groups that are connected to the same unit group in series. Positions of target branch ports associated with two unit groups connected to the same unit group in series are the same, actually indicating that positions of target branch ports associated with two unit groups separated by one unit group are the same. Two unit groups adjacent and connected to each other may form a set. Positions of target branch ports in unit groups in each set are different. Positions of target branch ports associated with two unit groups adjacent and connected to each other are different.

The number of antenna units included in an antenna unit group in the phased array unit is $2^n$. Unit groups in the phased array unit include unit group 1 (the first unit group is the antenna unit group), unit group 2, unit group 3 . . . unit group n−1, unit group n, and unit group n+1. The order of unit groups can be determined by odd and even numbers. The positions of target branch ports associated with two unit groups adjacent and connected to each unit group being the same can be understood that positions of target branch ports associated with odd unit groups are the same, positions of target branch ports associated with even unit groups are the same, and positions of target branch ports associated with two unit groups adjacent and connected to each other are different. It can be understood that the positions of the target branch ports associated with the odd unit groups are different from the positions of the target branch ports associated with the even unit groups.

Figure 10:
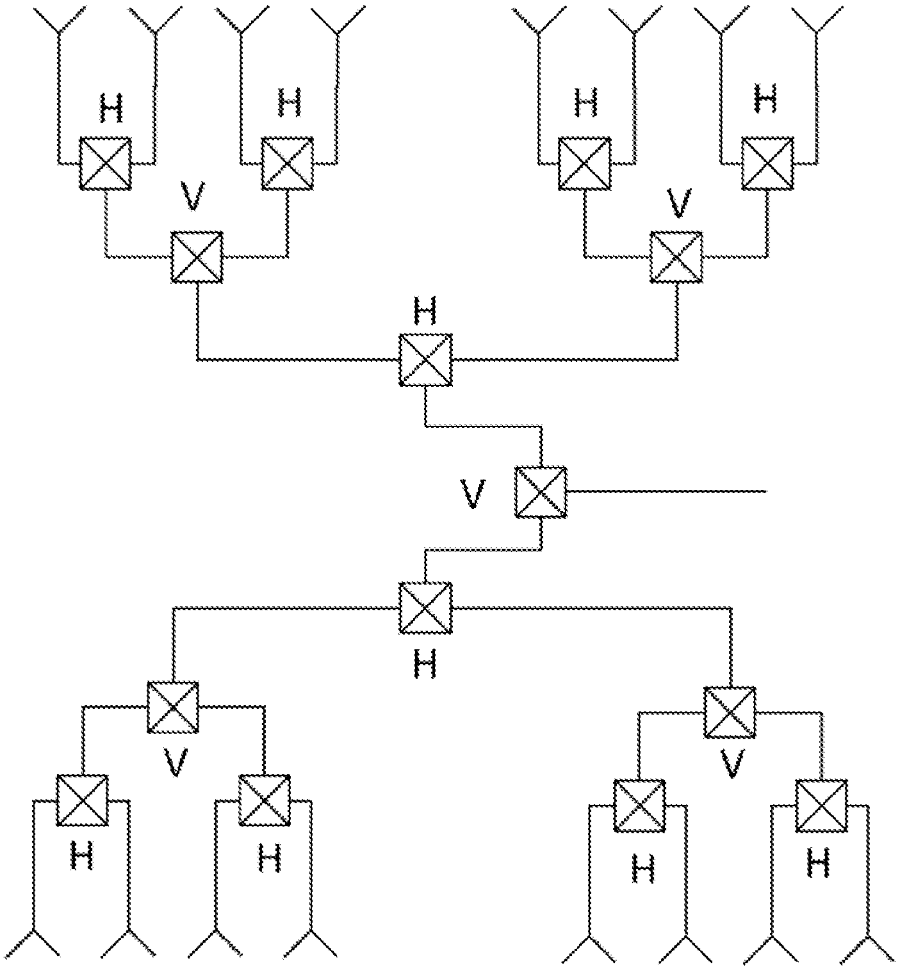
FIG. 10 is the diagram of a two-dimensional phased array according to embodiment four of the present application.

As shown in FIG. 10, the two-dimensional phased array units include four unit groups. The four unit groups include one antenna unit group and three phase-shifting unit groups to form a 4×4 phased array unit. The antenna unit group includes 16 antenna units. Positions of target branch ports of all H units are the same. Positions of target branch ports of all V units are the same. The H units are configured to control angle m of the beam. The V units are configured to control m+90°. For example, the H units are configured to control the horizontal angle of the beam. The V units are configured to control the vertical angle of the beam.

The phased array may include n-dimensional phased array units. n unit groups adjacent and connected to each other form a set. Positions of target branch ports associated with unit groups in each set are different. Positions of target branch ports associated with two unit groups separated by n−1 unit groups are the same.

The phased array may include multiple phased array units of different dimensions at the same time and may be set as needed. This embodiment of the present application is not limited thereto.

What is claimed is:

1. A phase-shifting unit, comprising:

a common port, a switch, and two connection ports;

wherein a transmission line between the two connection ports is provided with at least two branch ports, positions of the at least two branch ports on the transmission line are different, and a transmission line between every two adjacent branch ports of the at least two branch ports comprises a delay line;

wherein the switch is configured to switch to a target branch port of the at least two branch ports and establish a connection between the target branch port and the common port so that the common port is connected to the two connection ports to form two paths; and wherein each path of the two paths is configured to establish a communication connection between a connection port corresponding to the each path and the common port to transmit a signal, and magnitude of phase shift between a phase of an input signal of each path and a phase of an output signal of the each path matches a delay line comprised in the each path.

2. The phase-shifting unit according to claim 1, wherein the transmission line between the two connection ports comprises a plurality of delay lines, and the plurality of delay lines are symmetrical about a midpoint of the transmission line between the two connection ports.

3. An antenna unit, comprising:

the phase-shifting unit according to claim 2 and two antennas;

wherein the two connection ports of the phase-shifting unit are connected to the two antennas in one-to-one correspondence.

4. An antenna unit, comprising:

a phase-shifting unit and two antennas;

wherein the phase-shifting unit comprises a common port, a switch, and two connection ports, wherein a transmission line between the two connection ports is provided with at least two branch ports, positions of the at least two branch ports on the transmission line are different, and a transmission line between every two adjacent branch ports of the at least two branch ports comprises a delay line; the switch is configured to switch to a target branch port of the at least two branch ports and establish a connection between the target branch port and the common port so that the common port is connected to the two connection ports to form two paths; and each path of the two paths is configured to establish a communication connection between a connection port corresponding to the each path and the common port to transmit a signal, and magnitude of phase shift between a phase of an input signal of each path and a phase of an output signal of the each path matches a delay line comprised in the each path; and wherein the two connection ports of the phase-shifting unit are connected to the two antennas in one-to-one correspondence.

5. A phased array unit, comprising:

an antenna unit group and at least one phase-shifting unit group;

wherein the antenna unit group is connected to the at least one phase-shifting unit group in series;

wherein the antenna unit group comprises a plurality of antenna units, and each of the at least one phase-shifting unit group comprises at least one phase-shifting unit, wherein each antenna unit of the plurality of antenna units a phase-shifting unit and two antennas, and each phase-shifting unit of the at least one phase-shifting unit comprise a common port, a switch, and two connection ports, wherein a transmission line between the two connection ports is provided with at least two branch ports, positions of the at least two branch ports on the transmission line are different, and a transmission line between every two adjacent branch ports of the at least two branch ports comprises a delay line; the switch is configured to switch to a target branch port of the at least two branch ports and establish a connection between the target branch port and the common port so that the common port is connected to the two connection ports to form two paths; and each path of the two paths is configured to establish a communication connection between a connection port corresponding to the each path and the common port to transmit a signal, and magnitude of phase shift between a phase of an input signal of each path and a phase of an output signal of the each path matches a delay line comprised in the each path;

wherein the two connection ports of the phase-shifting unit are connected to the two antennas in one-to-one correspondence; and wherein of two adjacent unit groups connected in series, a common port of each unit in one unit group is connected to a connection port of one unit in another unit group located after the one unit group; a first unit group in the phased array unit is the antenna unit group, and a last unit group in the phased array unit is one phase-shifting unit group of the at least one phase-shifting unit group; and a common port of each antenna unit in the antenna unit group is connected to a connection port of one phase-shifting unit in a phase-shifting unit group which is adjacent to and located after the antenna unit group and is connected to the antenna unit group in series.

6. The phased array unit according to claim 5, wherein at least two phase-shifting unit groups are provided.

7. A phased array, comprising:

at least one phased array unit according to claim 5 and at least one signal transceiver module;

wherein each of the at least one signal transceiver module is connected to at least one of the at least one phased array unit;

wherein a common port of a phase-shifting unit in a last unit group of each phased array unit of the at least one phased array unit is connected to one signal transceiver module corresponding to the each phased array unit;

wherein the at least one signal transceiver module is configured to transmit a radio frequency signal to each phased array unit and receive a radio frequency signal transmitted by each phased array unit; and wherein each phased array unit is configured to adjust the radio frequency signal transmitted by the at least one signal transceiver module to radio frequency signals of different phases and transmit the radio frequency signals to space, and adjust a received radio frequency signal to radio frequency signals of different phases and transmit the radio frequency signals to the at least one signal transceiver module.

8. A phased array, comprising:

at least one phased array unit according to claim 4 and at least one signal transceiver module;

wherein each of the at least one signal transceiver module is connected to at least one of the at least one phased array unit;

wherein a common port of a phase-shifting unit in a last unit group of each phased array unit of the at least one phased array unit is connected to one signal transceiver module corresponding to the each phased array unit;

wherein the at least one signal transceiver module is configured to transmit a radio frequency signal to each phased array unit and receive a radio frequency signal transmitted by each phased array unit; and wherein each phased array unit is configured to adjust the radio frequency signal transmitted by the at least one signal transceiver module to radio frequency signals of different phases and transmit the radio frequency signals to space, and adjust a received radio frequency signal to radio frequency signals of different phases and transmit the radio frequency signals to the at least one signal transceiver module.

9. The phased array according to claim 8, wherein a number of antenna units comprised in the antenna unit group in each phased array unit is $2^n$, and n+1 is a number of unit groups in each phased array unit.

10. The phased array according to claim 9, wherein n is an even number; and among a plurality of unit groups connected in series in each phased array unit, positions of target branch ports associated with two unit groups adjacent and connected to each other are different, and positions of target branch ports associated with two unit groups adjacent and connected to each unit group are the same.

11. The phased array according to claim 10, wherein each signal transceiver module of the at least one signal transceiver module comprises a phase shifter, and the phase shifter is configured to adjust magnitude of phase shift between a plurality of phased array units connected to the each signal transceiver module.

12. The phased array according to claim 10, wherein characteristic impedance of a transmission line between two connection ports of each unit in each unit group in each phased array unit is equal to a product of impedance of a common port of the each unit and 2, and impedance of each connection port of the two connection ports is equal to a product of the impedance of the common port and 2.

13. The phased array according to claim 9, wherein each signal transceiver module of the at least one signal transceiver module comprises a phase shifter, and the phase shifter is configured to adjust magnitude of phase shift between a plurality of phased array units connected to the each signal transceiver module.

14. The phased array according to claim 9, wherein characteristic impedance of a transmission line between two connection ports of each unit in each unit group in each phased array unit is equal to a product of impedance of a common port of the each unit and 2, and impedance of each connection port of the two connection ports is equal to a product of the impedance of the common port and 2.

15. The phased array according to claim 8, wherein each signal transceiver module of the at least one signal transceiver module comprises a phase shifter, and the phase shifter is configured to adjust magnitude of phase shift between a plurality of phased array units connected to the each signal transceiver module.

16. The phased array according to claim 8, wherein characteristic impedance of a transmission line between two connection ports of each unit in each unit group in each phased array unit is equal to a product of impedance of a common port of the each unit and 2, and impedance of each connection port of the two connection ports is equal to a product of the impedance of the common port and 2.

* * * * *